United States Patent
Coleman et al.

(10) Patent No.: US 7,451,391 B1
(45) Date of Patent: Nov. 11, 2008

(54) METHOD FOR WEB PAGE RULES COMPLIANCE TESTING

(75) Inventors: Paul W. Coleman, Seattle, WA (US); Colin E. Birge, Seattle, WA (US); Brian D. Davia, Seattle, WA (US); Stephen Michael McKain, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 10/672,508

(22) Filed: Sep. 26, 2003

(51) Int. Cl.
*G06F 17/00* (2006.01)

(52) U.S. Cl. ...................... 715/234; 709/224

(58) Field of Classification Search ................. 715/513, 715/234
See application file for complete search history.

(56) References Cited

U.S. PATENT DOCUMENTS

| | | | | |
|---|---|---|---|---|
| 5,870,552 | A * | 2/1999 | Dozier et al. | 709/219 |
| 5,890,170 | A * | 3/1999 | Sidana | 715/501.1 |
| 6,002,871 | A * | 12/1999 | Duggan et al. | 717/135 |
| 6,549,944 | B1 * | 4/2003 | Weinberg et al. | 709/224 |
| 6,766,327 | B2 * | 7/2004 | Morgan et al. | 707/101 |
| 6,799,718 | B2 * | 10/2004 | Chan et al. | 235/375 |
| 6,886,115 | B2 * | 4/2005 | Kondoh et al. | 714/52 |
| 7,152,224 | B1 * | 12/2006 | Kaler et al. | 717/121 |
| 7,162,526 | B2 * | 1/2007 | Dutta et al. | 709/229 |
| 7,188,308 | B2 * | 3/2007 | Weise et al. | 715/273 |
| 2002/0133514 | A1 * | 9/2002 | Bates et al. | 707/501.1 |

OTHER PUBLICATIONS

"CAST Bobby: Manual for Downloadable Version 2000"(hereinafter "Bobby"), copyright 1996-2000 Center for Applied Special Technology (CAST), p. 1-23.*
Nentwich et al., "xlinkit: A Consistency Checking and Smart Link Generation Service", ACM Transactions on Internet Technology, vol. 2, No. 2, May 2002, p. 151-185.*
Brinck et al. "Automatically Evaluating the Usability of Web Sites", CHI2001, Apr. 20-25, USA, p. 906-907. ACM 1-58113-454-1/02/0004.*
W3C Web Accessibility Initiative—"Evaluation, Repair, and Transformation Tools for Web Content Accessibility" p. 1-11.*
Ladner, Richard E., Computer Accessibility for Federal Workers with Disabilities: It's the Law; Social Aspects of Computing special section, Communications of the ACM, Aug. 1989, p. 952, Association for Computing Machinery, Inc.
Gutierrez, Charletta F. and Long, Nancy M., Web Site Accessibility of AACSB-Accredited Universities: Meeting the Requirement of the Law(s), J. Educational Technology Systems, 2001-2002, pp. 69-84, vol. 30(1), Baywood Publishing Co., Inc.
Chamberlain, Helen, Opening Doors to Information Technology—Section 508 of the US Rehabilitation Act of 1973, ICCHP 2002, pp. 686-691, Springer-Verlag, Berlin Heidelberg.

* cited by examiner

*Primary Examiner*—Doug Hutton
*Assistant Examiner*—Amelia Rutledge
(74) *Attorney, Agent, or Firm*—Merchant & Gould (57) ABSTRACT

The present invention provides a method of testing a hypertext document for compliance with a selected criterion. The method (200) provides user prompts (201) for accepting user selections (202) of parameters to test a web page (or web pages) for compliance with selected rules. The web page is obtained (203) and sent, with selected rules, to a rules engine (204) for an analysis based on the selected rules (206). The raw analysis data is generated and stored (208). The analysis data is compiled and presented (210) to a user for error tracking and/or correction (212).

17 Claims, 3 Drawing Sheets

METHOD FOR WEB PAGE RULES COMPLIANCE TESTING

TECHNICAL FIELD

The present invention relates, generally, to the field of software development tools and, more specifically, to methods, systems and apparatuses for testing a hypertext document for compliance with selected rules.

BACKGROUND OF THE INVENTION

The World Wide Web is a collection of hypertext documents, or "web pages", which may contain text, pictures and/or sound. A hypertext document is written in a programming language to create an executable program. Since hypertext documents are written with generally compatible programming languages including Hypertext Markup Language, "HTML", Extensible Markup Language, "XML" and XHTML (Extensible Hypertext Markup Language), these documents can be presented, stored and distributed almost universally across a network of client terminals and servers, such as the public Internet or a private intranet.

As a web page is being developed, there are certain rules which must be followed. A project manager may include compliance testing as part of the modular programming stage of a project when each programmer has a section of code to write and debug. Alternatively, a project manager may choose to include compliance testing in the integration stage of a project when code sections are integrated into a complete document. However, it is difficult and time consuming for project managers to track down compliance problems at the integration stage of the development process. The origin of the problem may be embedded in a section of code or may be a result of the integration of the various sections. Further, after a web page has been developed, even if it is rules compliant at the time of development, the rules may change.

For example, a company or a department may change its name, or the name of a product. In this case it would be desirable to determine on which web pages the former name appears, and where on those web pages the former name appears.

As another example, a hypertext document should be in a format useful for presentation to all users. However, standardized programming syntax is often necessary to ensure the correct performance of assistive I/O software and devices, such as a web page reader, that are intended to allow certain disabled users access to web page content. Thus, it is often desirable to standardize hypertext documents for compliance with selected criteria or rules, which may be new rules, or which may be modifications to older rules. These rules may include code validation standards to which a document should adhere for uniform presentation, universal network compatibility, or compliance with government regulations. To that end, there has been a recent effort by governments and non-governmental agencies to establish accessibility rules that provide a standard for developers to follow when creating hypertext documents. For example, Section 508 of the U.S. Rehabilitation Act of 1973 was enacted to improve access to mainstream technology and provide standards for assistive technologies for disabled users.

Once rules, such as a name change or those in Section 508, have been developed and become effective, documents should be checked to ensure that they are rules compliant.

Programs are available wherein the user can specify a web page and the rule or rules to be tested, and the program will access that web page, analyze that web page for compliance with the specified rules, and provide a report. However, these programs are limited to analysis of a single web page, and only provide a report, not a copy of the web page, so each web page must be separately specified and tested. Also, someone must compile a list of the web pages to be analyzed and input this information, one web page at a time. This is tedious and time-consuming and very prone to errors. For example, in sites where there are hundreds or even thousands of web pages, some pages will be missed, and other pages will be unnecessarily tested several times. Further, the prior art does not provide information about a collection of tested web pages. For example, the prior art does not enable one to determine what rules are most problematic and where they occur.

Web crawler programs are also available. A web crawler program starts with a specified web page, copies and stores it, locates links within that web page to other web pages, accesses, copies and stores each of those web pages, etc. However, although web crawlers may eventually capture and store all of the web pages of an entire site, they do not analyze those web pages.

SUMMARY OF THE INVENTION

Briefly described, the present invention provides for accessing and analyzing a selected hypertext document for compliance with selected rules or criteria. Such rules include programming syntax, accessibility rules for disabled users, and name changes. In addition, the present invention provides for accessing, storing, and analyzing hypertext documents which are linked from the selected document.

The present invention therefore provides for linking one program, which will test a specified web page for compliance with specified rules, with another program, which accesses a web page, stores it, detects links to other web pages, accesses and stores those web pages, detects further links, etc. The present invention further provides for storing the results of these programs and compiling the results of the analysis.

Thus, the present invention provides for automatically accessing and analyzing a series of web pages rather than having to perform such access and analysis one page at a time under manual control. As a result, the user is provided with a comprehensive view of the rules compliance of an entire web site, or to a lesser degree if desired, including information regarding the errors, and where the errors occurred, and links to the web pages where the errors occurred.

The present invention preferably includes an input device, such as a client terminal, for accepting a user's selection of a document, the rules under which the document will be analyzed, and the number of levels which will be linked for analysis.

In an alternative embodiment, the present invention rather than storing just links to the web pages, also stores (archives) a copy of the web page. By storing the actual web page on which the analysis is performed, a snapshot of the web page at that point in time is available. This provides for future uses including presentation of errors and their effects on the web pages, such as for training or further analysis, and for comparison with past or future versions of web pages and/or testing rules, and their results.

The present invention particularly identifies which pages have been tested, which pages have passed or failed a particular test, what the most common failures are, etc. This capability allows developers to isolate problems earlier in the design cycle for greater efficiency in fixing problems and reducing the time penalties involved in isolating a problem.

DETAILED DESCRIPTION OF THE INVENTION

Figure 1:
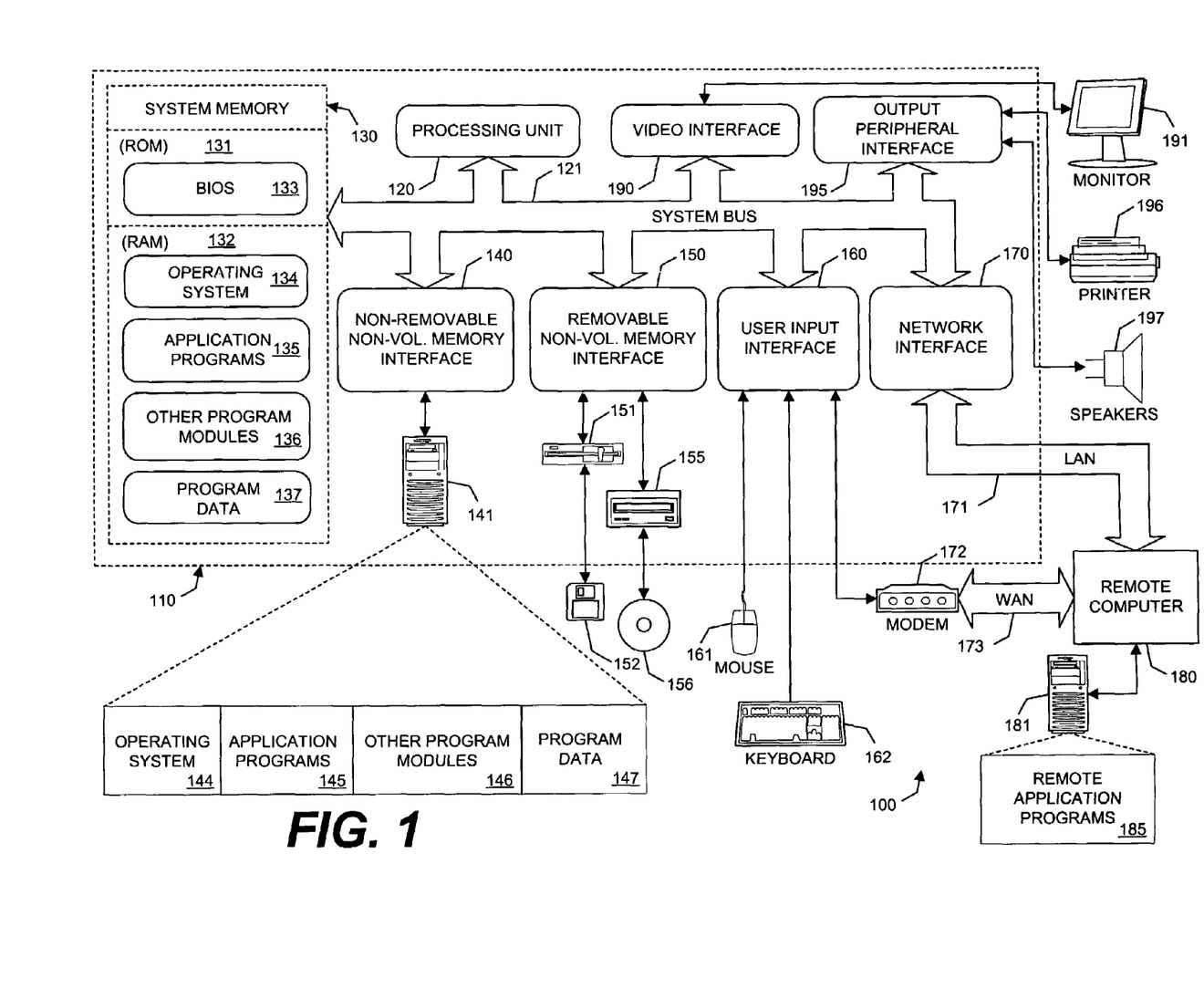
FIG. 1 illustrates an example of a suitable computing system environment on which the invention may be implemented.

Refer now to the drawings in which like numerals represent similar elements or steps throughout the several views. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one component or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media thus includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media includes any device or method for transferring data of any kind from one point to another. By way of example, and not limitation, communication media includes wired and wireless media, such as a wired network, direct-wired connection, and acoustic media, RF media, and infrared media.

The system memory 130 includes computer storage media such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other computer storage media such as, by way of example only, a hard disk drive 141, a magnetic disk drive 151 that reads from or writes to a magnetic disk 152, and an optical disk drive 155 that reads from or writes to an optical disk 156, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The computer storage media provide storage of computer readable instructions, data structures, program modules and other data for the computer 110. For example, hard disk drive 141 stores operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers for clarity of illustration.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 preferably operates in a networked environment connected 171, 173 to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated for the remote computer 180. In a networked environment, program modules depicted relative to the computer 110, or portions thereof, may be stored in the remote memory storage device. By way of example, and not limitation, FIG. 1 illustrates remote application programs 185 as residing on memory device 181.

The connections include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. It will be appreciated that the network connections shown are exemplary and other means of establishing a communications link between the computers may be used.

Figure 2:
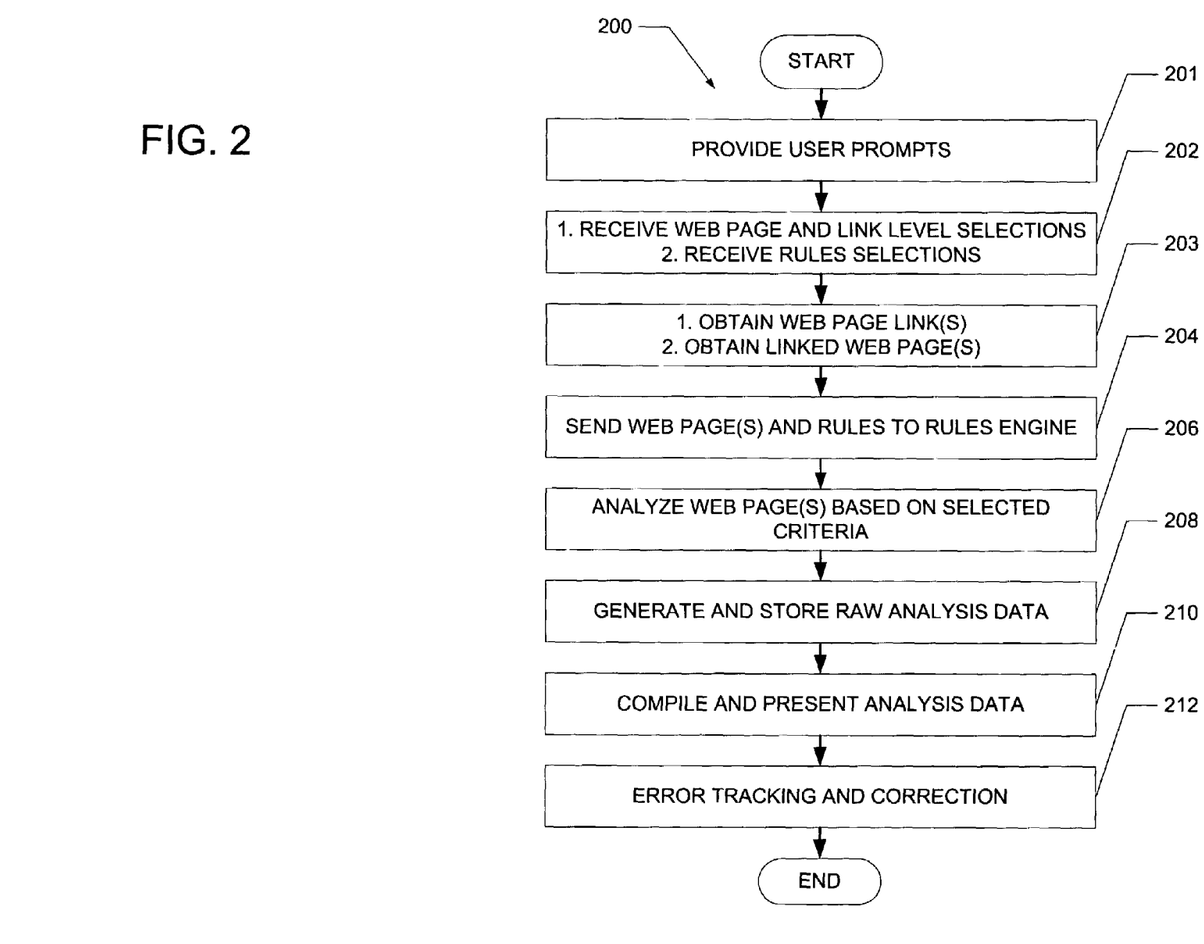
FIG. 2 illustrates a flowchart representing the basic operation of the rules engine component of the present invention.

Turn now to FIG. 2 which illustrates a flowchart representing the basic operation 200 for testing a web page for compliance with selected rules. For the purposes of this disclosure, a hypertext document includes, but is not limited to, text, sound and figures, and is written in one of various hypertext programming languages including HTML, XML, XHTML and other such programming languages that will be familiar to those skilled in the art or may be developed in the future. A hypertext document for the purposes of this disclosure may be, but is not limited to, all or a portion of a World Wide Web page ("web page") or a plurality of web pages which may be linked or non-contiguous. The selected rules are associated with a predetermined standard for web page content. They may be chosen to standardize web page content for the operation of certain universal devices such as web page reader device or other assistive technologies. The rules may also be associated with finding outdated or offensive material, copyright violations or the like. For example, the operation of a web page reader device may require the selected rules to be associated with accessibility standards for certain disabled users. In another example, a program or device may be configured to find outdated designations for a company that may have changed its name.

In operation, the user selects a starting web page, the link level, and the rules to be implemented. In one implementation of the invention cited for example and not limitation, a user may insert information for performing a compliance test on a web page at a prompt from a program. For example, it is well known to add "plug-ins" which provide additional features to existing programs. Thus, for example, if the user interface program is MICROSOFT® INTERNET EXPLORER® the plug-in may add the feature of "Compliance Testing" to the "Tools" menu. The user may then select "Compliance Testing" from the "Tools" menu, and an input prompt for a field or fields will be provided 201 to the user. The prompt may allow the user to input information such as a web page identifier for the starting web page, a number of layers of linked web pages to analyze, acceptable servers, and/or the rules to be implemented. The number of layers may be fixed or may be user selectable and, if user selectable, may or may not have a predetermined limit. This allows an analysis to be controlled so as to cover all of the web pages of a small site or a limited number of web pages at a large site. Limiting the number of link levels serves to prevent system disruptions due to an inordinate number of pages being accessed and/or analyzed. Alternatively, there may be a termination feature for terminating the analysis after a predetermined number of pages have been analyzed, regardless of whether or not the specified link level has been reached.

A prompt may also allow the user to insert non-contiguous web page identifiers to check non-contiguous web pages, including previously tested pages that a user may choose to retest. If necessary, the web page identifiers may be separated by any appropriate delimiter. The selected rules to be implemented may be previously established rules, such as from a database, may be inputted or modified manually by a user, or any combination thereof.

A prompt may also allow a user to specify whether or not to archive a copy of the web page.

Then, in step 202 this information and selection are received from the user. Typically, the user will be at a client terminal and the client terminal will send the user selections and information to a server for implementation. However, it is also contemplated that the client terminal will directly implement the present invention. It is also contemplated that the client terminal will implement some functions of the present invention and one or more servers will implement other functions of the present invention.

In step 203 the starting web page and the link level are sent to a web crawler engine which obtains the starting web page, stores it, determines any links to other web pages, and, if a link is within the specified link level and is to an acceptable server, then the linked web page is obtained. This is repeated until the link level is reached. A record is kept of each web page accessed so that, in the event web pages call each other, a previously accessed web page is not accessed and stored again.

In step 204 the retrieved web pages, and the selection of the rules to be implemented, are sent to the rules engine.

In step 206, the rules engine analyzes the selected web page or pages based on the selected rules criteria. The analysis comprises receiving at least one parameter indicative of the selected rules so it can be applied to analyze the web page. For example, if the selected rules involve spell checking, the parameter may represent the correct spelling of a word. As another example, if the selected rule involves a name change, the parameter may represent the old name. As another example, the parameter may be that each figure on a web page includes associated text.

As a result of the analysis, the rules engine generates and stores 208 raw analysis data indicative of whether the selected web page or pages are in compliance with the selected rules, a summary of analysis parameters including the date of the test and a description of the selected rules. One such rules engine is a component of the MICROSOFT® Office FrontPage® 2003 software application. The inventors chose this program for convenience and familiarity, but any program which performs this rules engine function is acceptable.

In step 210 the raw analysis data is compiled and the compiled data is presented to the user. The compiled analysis data may be displayed in a user selectable format such as a matrix or in a hypertext format. In addition to or in lieu of the raw analysis data, the compiled analysis data may include detailed information on the content errors discovered during the analysis, the pages or range of pages with errors, the types of errors found, the line number on which the error occurs, the first occurrence of the error on a page, the number of web pages at each link level, recommended fixes, the number of times a particular error appears, the number of errors in each page, links to the erroneous or offensive source code, summary information, recommended fixes or versions of the selected rules, and/or other data.

In step 212 the analysis data may also be presented to applications that track errors in relation to previous tests. For example, such applications would need to track pages that have been tested, specific errors, error resolutions and the like.

In step 212 the analysis data may also be presented to other applications programs to fix certain errors. Of course, for an error correction application program to fix an error, the error correction program must have access to the code on the web page server for the particular web page and the authority to modify that code. In addition, the error and the solution should be particularly definable so that the desired result is achieved. If this cannot be done, then the error correction program may be able to suggest a correction to an authorized user or programmer for review and approval, disapproval, or input of a different correction method. One such application that performs various error correction functions is the MICROSOFT® PREFix software application. Another software application that performs various error correction functions is the MICROSOFT® PREFast software application. The inventors chose these programs for convenience and familiarity, but any program which may perform error correction functions is acceptable.

Although the above has been described as a program which calls other programs to perform certain functions, it will be appreciated that some or all of the functions could be performed by a single program.

Although the above has been described as a series of steps in one or more computer programs, it will be appreciated that these steps may be executed by one or several instructions to a component or components that may comprise hardware, software, firmware or any combination thereof. These functions may be implemented alone or in conjunction with other programs such as, for example, a programming language complier.

Figure 3:
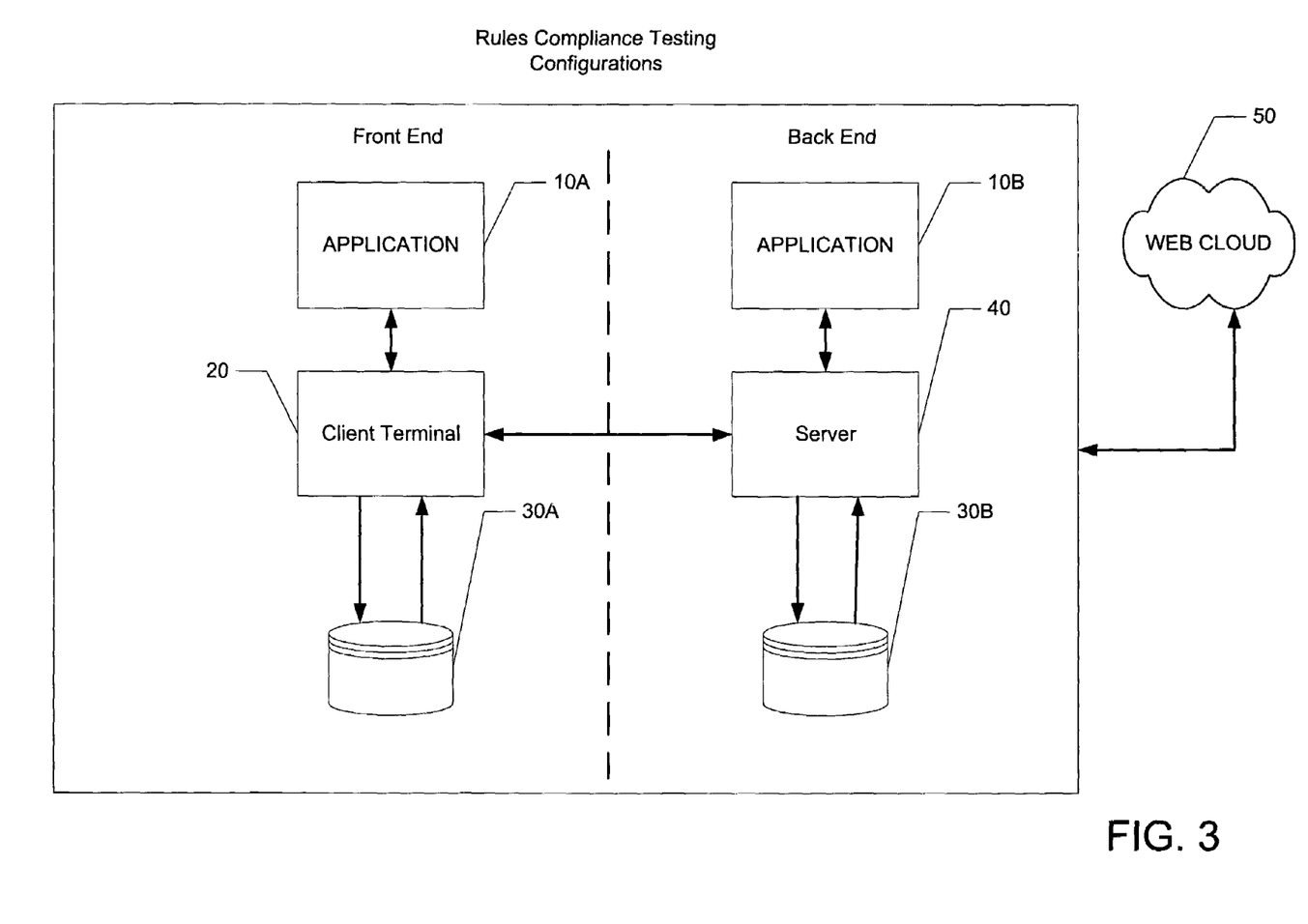
FIG. 3 is a block diagram representing various embodiments of the present invention.

FIG. 3 is a block diagram representing various embodiments of the present invention, showing front end (client side) components 10A, 20 and 30A, and back end (server side) components 10B, 30B and 40. Components 10A, 20 and 30A are application programs, the client terminal, and an associated memory, respectively. Components 10B, 40 and 30B are application programs, the server, and an associated memory, respectively. The application programs are those that implement the steps of FIG. 2.

In one embodiment it is assumed that components 10A, 20, 30A and 40 are present. In this embodiment the client terminal 20 implements the application programs 10A. The client terminal 20 accesses the server 40, obtains the specified web pages from the server 40, analyzes the specified web pages in accordance with the specified rules, and sends the links to these web pages and/or archives a copy of these web pages, and the analysis data, to memory 30A for storage.

In another embodiment it is assumed that components 20, 30A, 10B and 40 are present. In this embodiment the client terminal 20 provides the user selections to the server 40. The server 40 implements the application programs 10B, retrieves the specified web pages, analyzes the specified web pages in accordance with the specified rules, and stores the links to these web pages and/or archives a copy of these web pages, and the analysis data, in the memory 30A. This embodiment has the advantage of utilizing the processing capabilities of a centralized server rather than potentially limited client terminal resources.

In still another embodiment it is assumed that components 20, 10B, 30B and 40 are present. In this embodiment the client terminal 20 provides the user selections to the server 40. The server 40 implements the application programs 10B, retrieves the specified web pages, analyzes the specified web pages in accordance with the specified rules, and stores the links to these web pages, and the analysis data, in the memory 30B. The server 40 also preferably archives a copy of the actual web pages, even though they may already exist in memory in server 40, so as to provide a snapshot copy of the web page as it existed at the time the analysis was performed. This embodiment also has the advantage of utilizing the storage and processing capabilities of a centralized server rather than potentially limited client terminal resources.

In still another embodiment it is assumed that components 10A, 20, 30A, 10B, 30B and 40 are present. In this embodiment the client terminal 20 may implement one or more of the programs 10A and the server may implement other programs 10B, some of the analysis data may be stored in memory 30A, and other data may be stored in memory 30B. For example, the server 40 could implement the web crawler program in 10B, and store the web pages in memory 30B, and the client terminal 20 could then retrieve these stored web pages from memory 30B, implement the rules analysis program in 10A, and then store the analysis in memory 30A. This embodiment also has the advantage of utilizing the storage and processing capabilities of a centralized server rather than relying completely on potentially limited client terminal resources.

Other variations of assigning programs and storing links to the web pages, the actual web pages and results are possible.

Preferably, the web pages which are to be analyzed are stored on the server 40 or a memory associated therewith. However, this is not a requirement and the web pages which are to be analyzed may be stored on another server, which may or may not be associated with the server 40. That is, the desired web pages which are analyzed may be stored anywhere that is accessible to the client and server side engines (i.e., anywhere in the web cloud 50). For example, if a company has a web site, but does not care to have its own personnel perform the rules implementation analysis, that company may contract with a consultant to do so. The consultant, if not operating from the company's facility, may use his/her own client terminal 20 and server 40, in which case the server 40 will contact the server of the company to obtain the desired web pages.

The present invention thus provides for testing of a web page to determine whether the selected web page meets certain rules. For example, in accordance with Section 508, a web page which has a picture should also have text in association with that picture and preferably providing a least a short description of the figure. This text, which may be hidden text, can be read by a machine and spoken out loud so that a visually-impaired person will be able to obtain at least some of the benefit from the picture. The present invention therefore provides for testing a web page to determine if there is a reference to a figure. This is easily determined by looking for an "IMG" tag or links or references to specific file types, such as .jpg, .tiff, etc. If there is a tag, link or reference to a figure then the web page is marked.

It is then determined whether there is a link from the figure, or associated with the figure, to a text document. This may also be determined by looking for links or references to alternate text ("ALT") to the IMG tag, or for specific file types, such as .txt, .doc, etc. If the IMG tag is found, but there is no ALT parameter, then there is an error. If the IMG tag is found, and there is an ALT parameter, then the ALT parameter is inspected for data that is suspicious. For example, the ALT text is typically specified to be five words or less. If the ALT text is found to be more than five words, then a flag may be generated as the ALT text may not be in compliance. Also, ALT" ", which is null, is sometimes used as a placeholder, which is valid, but it may be an error if it is associated with an IMG tag, as it does not describe the image. Thus, if a link is not found, then it is presumed that the web page is not in compliance. However, if a link is found then further testing may be required to verify that the web page is in compliance. In an alternative embodiment, the web page may be marked, regardless of whether or not it is in compliance, so that the rules may be tested for accuracy.

In addition, some persons are color-blind, so certain shades of text on certain backgrounds would be unreadable to those persons. The present invention allows rules relating to background colors and text colors to be defined and implemented so as to detect occurrences of this problem which would not even be noticed by a color-perceptive programmer.

When a web page is being tested, if there is a link to another web page, that link is stored, that linked web page may be retrieved, and that linked web page may also be tested for compliance. However, there is preferably a limit on the testing of linked web pages; it is generally desirable only to test related web pages, e.g., those with the same primary address, and not those with an external address. For example, if the selected web page is at www.abc5xyz6.com/user1 and has links to web pages at www.abc5xyz6.com/user2 and www.def7tuv8.com/user3 then it may be acceptable to test the web page at www.abc5xyz6.com/user2, but it would probably not be desired to test the web page at www.def7tuv8.com/user3.

Also, it is also generally desirable only to test to a certain level of linkage. For example, assume that the selected web page is at www.abc5xyz6.com/user1. Assume further that the selected web page has a link to a second web page at www.abc5xyz6.com/user2. Assume further that the second web page has a link to a third web page at www.abc5xyz6.com/user3. Assume that the third web page has a link to a fourth web page at www.abc5xyz6.com/user4, and so on. It may be desirable to limit the number of links to, for example, two levels away from the selected page so that the web pages at www.abc5xyz6.com/user2-user3 are examined, but web pages www.abc5xyz6.com/user4 and further are not examined. These limitations are for convenience of use and conservation of processor time and memory space and are not limitations on the capabilities of the present invention.

Further, in some situations, it may be desirable that there be no links at all to certain web pages or to unrelated web pages or servers. Thus, each link on a web page may be examined to verify that there are no undesired or malicious links inserted by a hacker or a disgruntled employee or former employee. Examples of such undesired or malicious links are a link to an external or pornographic web site, and a link to sensitive or proprietary company records, such as personnel data, research data, or financial data.

As each page is tested, and the links are detected, the links are also recorded. That way, if web pages have links to each other, then a loop will not be established, nor will processor time nor memory space be wasted retesting the same, previously-tested web page.

Also, the analysis for a web page need not be for a single test as the present invention contemplates that multiple tests may be performed on a web page. For example, an analysis could have a test for spelling, a test for grammar, and a test for Section 508 compatibility.

In addition, the analysis may be performed on-line or off-line. That is, a web page may be downloaded and analyzed in real time (on-line), or a web page may be downloaded, stored, and analyzed at a later time (off-line), such as when the available processor power is not being fully used and is available for other, generally lower-priority, applications. This may be a user-selectable option or it may be predetermined by the computer resources manager.

Further, the present invention is useful with any situation for which a rule can be defined. For example, the present invention is useful for determining if a web page contains a spelling error, an error in grammar or a link to an improper web site or page.

Finally, once the analysis is performed, the user can view the results immediately or the stored results may be called up at a later time for review.

The stored analysis allows the test to be run again at a later time to determine whether the errors, if any, have been fixed or whether, as a result of modifications, new errors have been created which were not previously there.

Thus, the present invention allows the user to select a starting web page for rules-compliance analysis, how many link-levels deep should be tested, the number and type of tests that will be performed, the types of links that are acceptable, whether the tests will be performed on-line or off-line, and when the results will be reviewed. These benefits are independent of each other and may be implemented, or not, as desired.

The present invention has been described in relation to particular embodiments, which are intended in all respects to be illustrative rather than restrictive. Alternate embodiments will become apparent to those skilled in the art to which the present invention pertains without departing from its spirit and scope. Accordingly, the scope of the present invention is to be limited only by the claims below.

We claim:

1. A computer-executable method of testing a hypertext document for compliance with a selected criterion, the method comprising:

accepting a user selection of the selected criterion and user input of at least one parameter indicative of compliance with the selected criterion for an analysis of the hypertext document, wherein accepting a user selection further comprises accepting, for analysis, a user designated limited number of related hypertext documents linked to the hypertext document for retrieval, the related hypertext documents comprising the same primary address as the hypertext document, the primary address comprising an internal address associated with the hypertext document and the related hypertext documents, wherein the user selection further comprises accepting, for the analysis, a user designated limited number of link levels, wherein the link levels comprise a first link from the hypertext document to a first one of the related hypertext documents and a second link from the first one of the related hypertext documents to a second one of the related hypertext documents;

performing the analysis of the hypertext document and generating analysis data, the analysis data comprising an indication of whether the hypertext document is in compliance with the selected criterion;

correcting a definable error by presenting the analysis data to an application program;

storing the analysis data and the link information for the hypertext document; and presenting at least a portion of the analysis data to the user;

wherein the selected criterion involves a name change, the name change comprising changing an outdated designation for a company associated with the hypertext document.

2. The method of claim 1, after performing the analysis, further comprising:

examining the hypertext document for a link to another hypertext document; and performing the analysis of the other hypertext document and generating analysis data, the analysis data comprising an indication of whether the other hypertext document is in compliance with the selected criterion;

wherein the step of storing the analysis data further comprises storing the analysis data for the other hypertext document; and wherein presenting at least a portion of the analysis comprises presenting compiled summary information based on the selected criterion about a collection of hypertext documents comprising the hypertext document and the other hypertext document thereby identifying what criterion is most problematic with the collection.

3. The method of claim 1, wherein the selected criterion further involves verifying that each figure on the hypertext document includes associated text and wherein accepting the user input of at least one parameter indicative of compliance with the selected criterion comprises accepting user input of at least one of the following:

correct spelling of a word when the selected criterion involves spell checking;

a previous name when the selected criterion involves a name change; and a reference to an image file type and alternate text when the selected criterion involves a requirement that each figure on the hypertext document include associated text.

4. The method of claim 1, further comprising:

suggesting a correction to an indefinable error to a user such that the user may review and approve or disapprove the correction.

5. The method of claim 1, further comprising:

prompting a user for a correction to an indefinable error such that the user may input the correction.

6. The method of claim 1 wherein performing the analysis of the hypertext document comprises analyzing a hypertext document written in one of the following languages:

extensible markup language; and extensible hypertext markup language.

7. The method of claim 1 wherein the selected criterion further involves detecting whether text colors and background colors comply to avoid accessibility issues for color-blind users.

8. The method of claim 2, further comprising:

prompting a user to specify whether to store copies of the hypertext documents;

copying the hypertext documents; and storing the copies of the hypertext documents thereby providing a snapshot of each hypertext document at a point in time of analysis.

9. The method of claim 2, further comprising terminating the analysis in response to a predetermined number of hypertext documents being analyzed independent of whether any specified link level has been reached.

10. The method of claim 8, further comprising storing a record of each hypertext document accessed for analysis to prevent previously accessed hypertext documents from being accessed and stored again due to being referenced by another hypertext document.

11. A method of testing a hypertext document for compliance with a selected criterion, said method comprising:

accepting a user selection of the selected criterion and a user input at a client terminal, the user input having at least one parameter indicative of compliance with the selected criterion for an analysis of the hypertext document, wherein accepting a user selection further comprises accepting, for analysis, a user designated limited number of related hypertext documents linked to the hypertext document for retrieval, the related hypertext documents comprising the same primary address as the hypertext document, the primary address comprising an internal address associated with the hypertext document and the related hypertext documents, wherein the user selection further comprises accepting, for the analysis, a user designated limited number of link levels, wherein the link levels comprise a first link from the hypertext document to a first one of the related hypertext documents and a second link from the first one of the related hypertext documents to a second one of the related hypertext documents;

transmitting the user selection and the user input to a server, the server having a rules engine component for analyzing the hypertext document based on the user selection and the user input;

performing the analysis of the hypertext document at the server and generating analysis data, the analysis data comprising an indication of whether the hypertext document is in compliance with the selected criterion;

presenting the analysis data to an application program to correct a definable error in the hypertext document; and presenting at least a portion of the analysis data to the user at the client terminal;

wherein the selected criterion involves at least one of the following:

detecting undesirable links;

spell checking;

a name change.

12. The method of claim 11 wherein each link on the hypertext document is examined to detect whether each link is undesirable wherein undesirable links include at least one of the following:

a link to a pornographic website; and a link to sensitive company records including at least one of the following:

personnel data;

research data; and financial data.

13. The method of claim 11 and, after performing the analysis, further comprising:

examining the hypertext document for a link to another hypertext document; and performing an analysis of the other hypertext document at the server and generating analysis data, the analysis data comprising indication of whether a collection of the other hypertext document and the hypertext document is in compliance with the selected criterion.

14. A method of testing a hypertext document for compliance with a selected criterion, said method comprising:

accepting a user selection of the selected criterion and a user input at a client terminal, the user input having at least one parameter indicative of compliance with the selected criterion for an analysis of the hypertext document, wherein accepting a user selection further comprises accepting, for analysis, a user designated limited number of related hypertext documents linked to the hypertext document for retrieval, the related hypertexts document comprising the same primary address as the hypertext document, the primary address comprising an internal address associated with the hypertext document and the related hypertext documents, wherein the user selection further comprises accepting, for the analysis, a user designated limited number of link levels, wherein the link levels comprise a first link from the hypertext document to a first one of the related hypertext documents and a second link from the first one of the related hypertext documents to a second one of the related hypertext documents;

performing the analysis of the hypertext document and generating analysis data, the analysis data comprising an indication of whether the hypertext document is in compliance with the selected criterion;

transmitting the analysis data to a server, presenting the analysis data to an application program to correct a definable error; and storing the analysis data at the server in a non-volatile memory;

wherein the at least one parameter comprises one of the following:

correct spelling of a word when the selected criterion involves spell checking;

relevant text, sound, or figures when the selected criterion involves finding copyright violations;

acceptable links when the selected criterion involves detecting undesirable links;

a previous name when the selected criterion involves a name change; and updated text when the selected criterion involves outdated material.

15. The method of claim 14 wherein accepting a user selection further comprises accepting at least one of the following:

a user designation of a number and type of tests that will be performed;

a user designation of one or more types of links that are acceptable; and a user designation of whether the tests will be performed offline or online;

wherein the analysis is performed online or offline.

16. The method of claim 14 and, after the step of performing the analysis, further comprising:

examining the hypertext document for a link to another hypertext document;

performing the analysis of the other hypertext document and generating analysis data, the analysis data comprising an indication of whether the other hypertext document is in compliance with the selected criterion; and transmitting the analysis data for the other hypertext document to the server;

wherein the step of storing the analysis data further comprises storing the analysis data for the other hypertext document at the server in the non-volatile memory.

17. A server operational to test a hypertext document for compliance with a selected criterion, comprising:

a user interface operational to receive a user selection of the selected criterion and user input of at least one parameter indicative of compliance with the selected criterion for an analysis of the hypertext document, wherein the user selection comprises a user designated limited number of related hypertext documents linked to the hypertext document for retrieval, the related hypertext documents comprising the same primary address as the hypertext document, the primary address comprising an internal address associated with the hypertext document and the related hypertext documents, wherein the user selection further comprises accepting, for the analysis, a user designated limited number of link levels, wherein the link levels comprise a first link from the hypertext document to a first one of the related hypertext documents and a second link from the first one of the related hypertext documents to a second one of the related hypertext documents;

a processor component operational to retrieve the hypertext document, to perform the analysis of the hypertext document, to examine the hypertext document to identify links to other hypertext documents, to generate analysis data, to present the analysis data to an application program to correct a definable error, and to store the link information for the hypertext document, and the analysis data, the analysis data comprising an indication of whether the hypertext document is in compliance with the selected criterion; and a non-volatile memory operational to store the analysis data and the link information for the hypertext document;

wherein the selected criterion involves
a name change.

* * * * *